US006556318B1

(12) United States Patent
Goldstein et al.

(10) Patent No.: US 6,556,318 B1
(45) Date of Patent: Apr. 29, 2003

(54) METHOD AND APPARATUS FOR SIGNAL AND SWITCH MONITORING IN AN OPTICAL CROSS CONNECT

(75) Inventors: Evan Lee Goldstein, Princeton, NJ (US); Lih-Yuan Lin, Middletown, NJ (US); Leda Maria Lunardi, Marlboro, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/198,684

(22) Filed: Nov. 24, 1998

Related U.S. Application Data
(60) Provisional application No. 60/093,385, filed on Jul. 20, 1998.

(51) Int. Cl.[7] .......................... H04B 10/08; H04J 14/00; G02B 26/08; G02B 26/00
(52) U.S. Cl. ...................... 359/110; 359/224; 359/291
(58) Field of Search ............................. 359/298, 214, 359/221, 224, 295, 291

(56) References Cited

U.S. PATENT DOCUMENTS

| | | | |
|---|---|---|---|
| 5,208,880 A | 5/1993 | Riza et al. ............... 385/18 |
| 5,661,591 A | * 8/1997 | Lin et al. ............... 359/290 |
| 5,771,320 A | 6/1998 | Stone ..................... 385/16 |
| 5,784,212 A | * 7/1998 | Hornbeck ................ 359/871 |
| 5,969,848 A | * 10/1999 | Lee et al. ................ 359/298 |
| 6,028,689 A | * 2/2000 | Michalicek et al. ....... 359/224 |

OTHER PUBLICATIONS

Lin et al, "Surface–Micromachined Micro–XYZ Stages for Free–Space Microoptical Bench", Mar. 1997, IEEE Photonics Technology Letters, vol. 9, No. 3, pp. 345–347.*
Lin et al, "Free–Space Micromachined Optical Switches with Submillisecond Switching Time for Large–Scale Optical Crossconnect", Apr. 1998, IEEE Photonics Technology Letters, vol. 10, No. 4, pp. 525–527.*

* cited by examiner

*Primary Examiner*—Leslie Pascal
*Assistant Examiner*—Dalzid Singh

(57) ABSTRACT

The present invention provides a variety of methods and apparatus for monitoring signal quality and switch operation for optical switches in an optical cross connect. The signal quality can be checked by using a beamsplitter to reflect a portion of the light beam carrying the signal onto a photodetector which is connected to a device which can monitor loss of signal, loss of frame, and other transmission characteristics. The position of a switch or waveguide can be monitored by circuits which detect variable levels of resistance and capacitance based on the switch's position or by reflecting probe light beams off the back of the switching mirror. The present invention also provides a method for determining if the signal quality photodetector is functioning correctly.

9 Claims, 6 Drawing Sheets

METHOD AND APPARATUS FOR SIGNAL AND SWITCH MONITORING IN AN OPTICAL CROSS CONNECT

This application claims the benefit of U.S. Provisional Application No. 60/093,385 filed Jul. 20, 1998.

FIELD OF THE INVENTION

The present invention is directed to a method and apparatus for monitoring the position of an optical switch and detecting errors in the transmission quality of the signal being transmitted through it. The present invention is also directed to a plurality of such apparatuses being used to monitor a plurality of switches within an optical cross connect.

BACKGROUND OF THE INVENTION

The demand for both greater volume and speed on long distance telecommunications networks has resulted in the rapid improvement of point to point optical transport systems (OTS). These systems can now transport data at rates greater than 20 Gb/s along a single fiber. As a result, demand for systems to provision this traffic and restore it in the event of a network failure has increased as well. The issue of restoration is further complicated by the need for it to occur very rapidly, on the time scale of a few seconds or less, and thus detection of the network faults that make restoration necessary must also be performed very rapidly.

One potential solution to this detection problem is through the utilization of "opaque" networks with optoelectronic transponder interfaces to perform fault detection as illustrated in FIG. 1. In this configuration, a signal is received along optical fiber 101 and fed into transponder 102. Transponder 102 is an optoelectronic device that translates the optical signal into an electronic signal, performs tests for loss of signal, loss of frame, etc., then translates the signal back into an optical signal, and sends it on to optical cross connect (OXC) 103. If transponder 102 detects an error, it notifies OTS management system 104 which in turn notifies network management system 105. Network management system 105 notifies OXC management system 106 which can then begin the restoration process in the OXC 103.

This method suffers from several shortcomings. The communication of error information will have to occur through several elements of the system, most likely using software interfaces. These system components could potentially come from multiple vendors. In this arrangement, the likelihood of achieving the desired response times for network restoration is greatly decreased.

SUMMARY OF THE INVENTION

The present invention is directed to methods and apparatuses for detecting errors in the signals being transmitted through an optical switch and monitoring the position of the switch in order to improve network restoration time. The optical switch that the present invention operates on is composed of a micromachined mirror that is attached via a hinge to a substrate at an angle to the direction of the light beam so that when the mirror is parallel to and level with the substrate, in the "off" state, the light beam passes by it without disruption but when the mirror is perpendicular to the substrate, in the "on" state, the light beam is redirected to another destination. These switches can be used in combination to form an optical cross connect for routing light beams between multiple destinations. A device of this type is fully described in a co-pending patent application entitled FIBER-OPTIC FREE-SPACE MICROMACHINED MATRIX SWITCHES, Ser. No. 09/001,676, filed Dec. 31, 1997 and is incorporated herein by reference.

The present invention monitors the light beam signal exiting the optical switch for errors and, if errors are detected, the invention narrows the possible causes by checking the error detecting sensor for failure and checking the position of the mirrors to ensure that they are set correctly for the proper transmission of the light beam.

The present invention monitors the signal for errors by using a beamsplitter placed in the path of the light beam to redirect a portion of the light beam onto a photodetector. The photodetector converts the light into an electronic signal that can be processed to detect loss of signal, loss of frame, and other errors using well known transmission error detection routines.

The present invention also provides three methods for detecting the state of the optical switch by monitoring the physical position of the micromachined mirrors.

The first method utilizes a circuit formed by conductive material along the mirror, the substrate, and along a probe mounted on the substrate that touches the conductive material on the mirror only when the mirror is substantially perpendicular to the substrate. The state of the mirror in the switch can be determined by the resistance of the circuit. If the circuit has finite resistance, the mirror is perpendicular and the switch is "on." If the circuit has a nearly infinite resistance, i.e., an open circuit, the mirror is not perpendicular and the switch is "off."

The second method also utilizes a circuit formed by conductive material along the mirror, the substrate, and along a probe mounted on the substrate. However, the probe in this case does not touch the mirror when it is perpendicular to the substrate, but rather the probe is parallel to the mirror a short distance away. The position of the mirror can be determined by measuring the capacitance of the circuit created. The closer the mirror is to the perpendicular "on" state, the higher the capacitance value will be.

The third method involves an additional optical input and output for each switch wherein a second light beam is generated by the optical input, reflected off the back of the mirror to the optical output, and the position of the mirror can be monitored based on the information returned by the light beam. If the light beam is reflected to the optical output, then the switch mirror is in the "on" state; if the light beam is not reflected to the optical output, then the switch mirror is in the "off" state.

DETAILED DESCRIPTION

Figure 1:
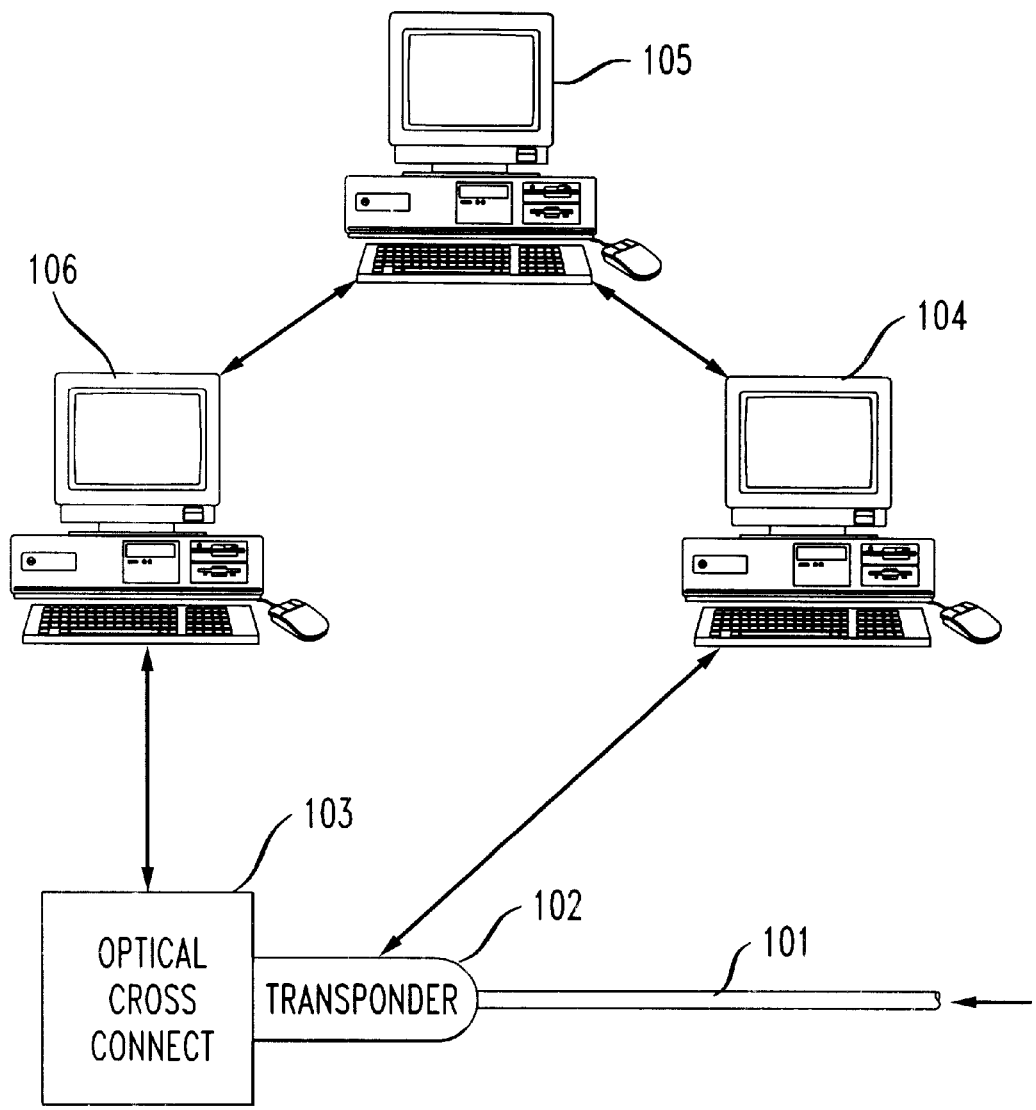
FIG. 1 illustrates a known configuration for implementing a system to perform fault detection using optoelectronic transponder interfaces.
Figure 2:
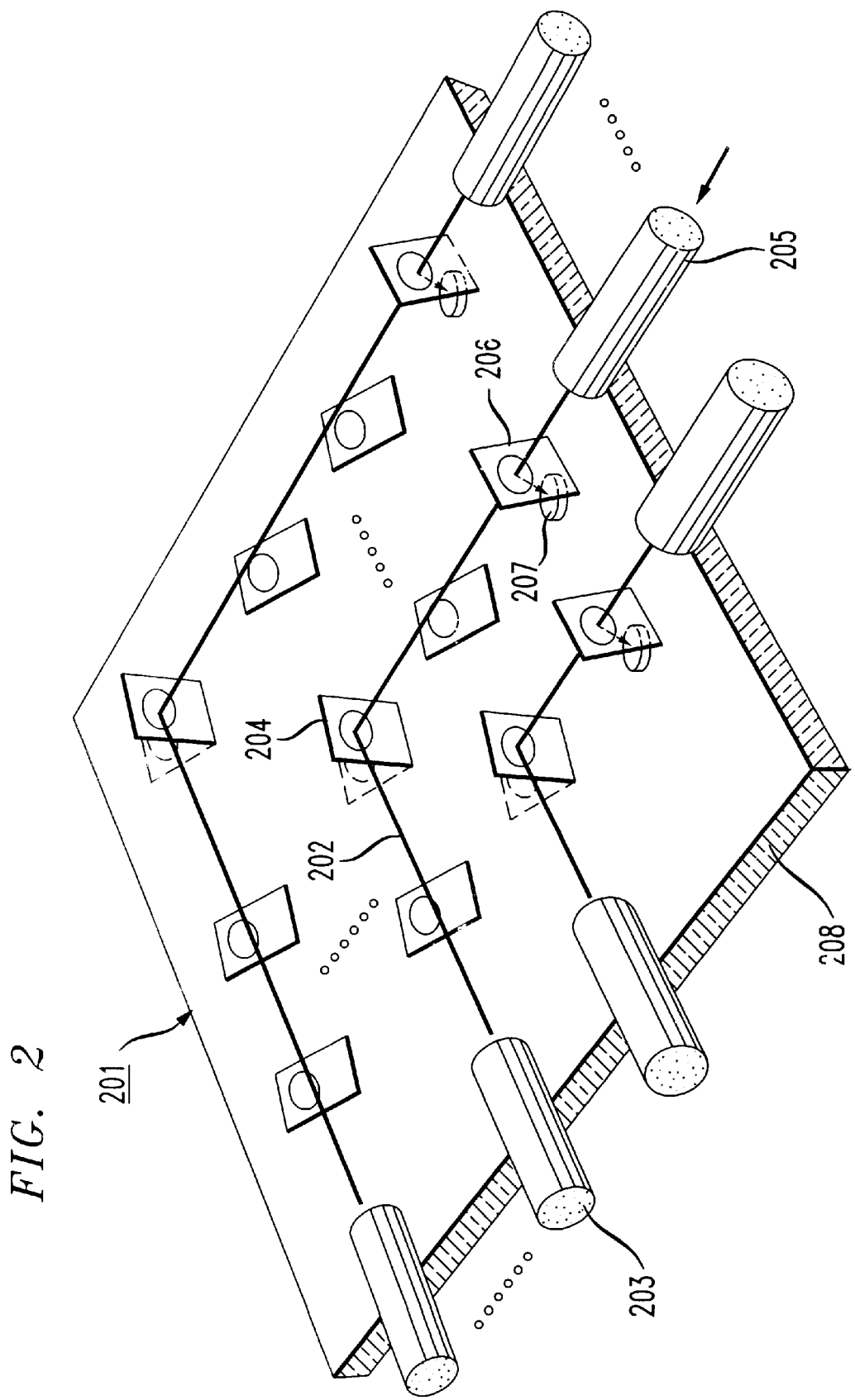
FIG. 2 is a perspective view of an optical cross connect apparatus with fault detection using the beam splitting method and apparatus of the present invention.

An embodiment of the present invention is shown in FIG. 2 wherein optical cross connect 201 is constructed of a plurality of individual optical switches, each having error detection capabilities provided by the present invention. A data transmission carried via light beam 202 enters OXC 201 through fiber 203. Light beam 202 is then redirected by switch mirror 204 and exits the switch through fiber 205. Before exiting OXC 201, however, light beam 202 passes through beamsplitter 206 which redirects a small portion of the light beam onto photodetector 207. Photodetector 207 translates the reflected portion of light beam 202 into an electrical signal which can then be analyzed by a processor unit to determine characteristics of the data transmission. These characteristics can include, but are not limited to, loss of signal, loss of frame, signal quality, and verification of switching path. Beamsplitter 207 as shown in FIG. 2 is a 45 degree beamsplitter, but this should not be construed as a limiting factor. Switch mirror 204, beamsplitter 206, and photodetector 207 are all integrated onto the substrate 208.

Figure 3:
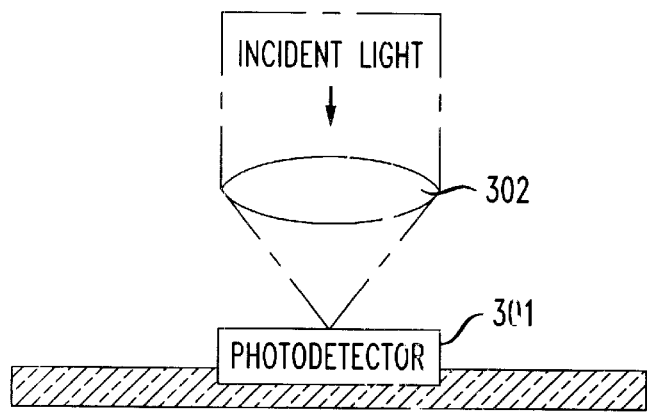
FIG. 3 is a side view of a micro lens positioned between the photodetector and the beamsplitter.

As shown in FIG. 3, the efficiency of photodetector 301 can be enhanced by mounting micro lens 302 on the substrate so that the portion of the light beam reflected by the beamsplitter passes through micro lens 302 and is focused on photodetector 301. Photodetector 301 can be of various types based on the transmission characteristics to be gathered. For detection of only loss of signal, a low speed photodetector can be employed. A higher speed and more sophisticated photodetector can be employed to gather loss of signal, loss of frame, and other signal quality indicators. Photodetector 301 may also be used to read the header information in the signal to verify that the light beam is on the correct communication path based on its final destination or to perform parity checking on the data being transmitted.

Figure 4:
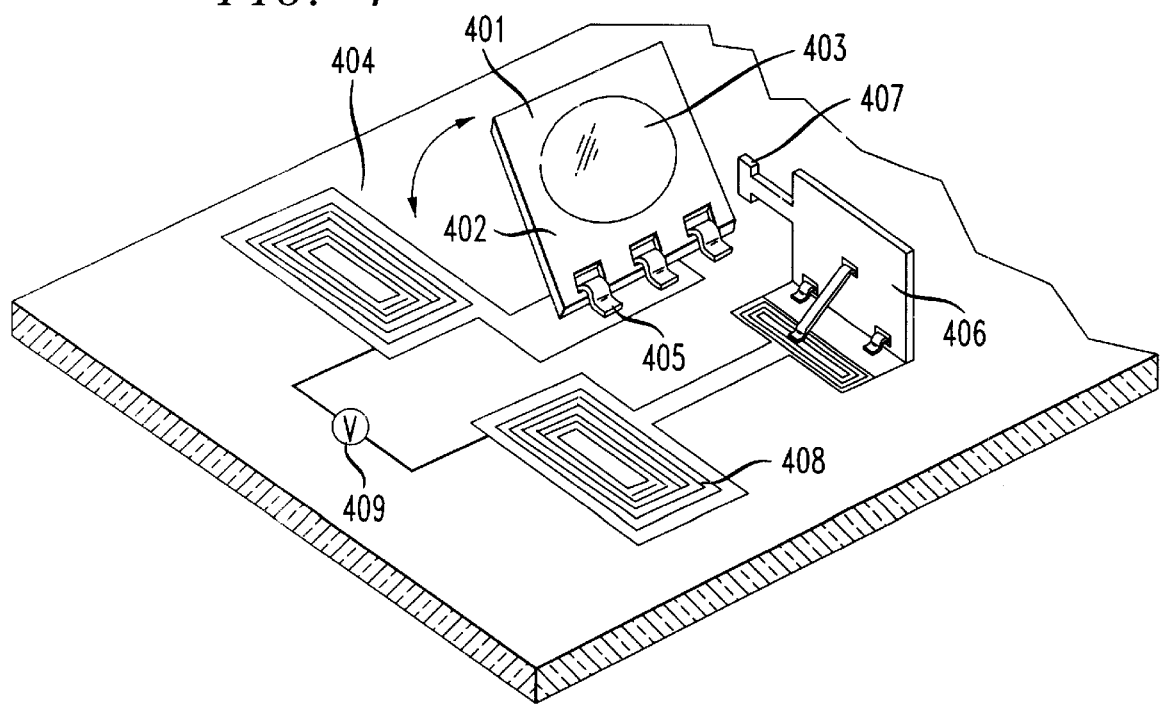
FIG. 4 is a perspective view of a switching mirror with position monitoring via the resistance method and apparatus of the present invention.

FIG. 4 shows an embodiment of an apparatus to monitor the position of the switch mirror using electrical resistance measurements. Switch mirror 401, consisting of conductive plate 402 with reflective surface 403, is attached to substrate 404 via hinge mechanism 405. Switch mirror 401 can rotate from a position which is parallel to and level with substrate 404 to a position substantially perpendicular to substrate 404. It is in this perpendicular position that switch mirror 401 is "on", that is, the mirror at this position reflects and redirects the light beam carrying the data transmission through the switch. A smaller conductive plate 406 with probe 407 protruding from one edge of it is also connected to substrate 404 via a hinge mechanism and is positioned such that the end of probe 407 touches conductive plate 402 when switch mirror 401 is in the perpendicular position. Conductive plate 406 can be affixed permanently in position on substrate 404 or can be hinged and moved into position when required. Circuit 408 on substrate 404 connects conductive plate 402 with probe 407, and on this circuit sensor 409 measures the resistance between probe 407 and conductive plate 402. When switch mirror 401 is in the perpendicular position, probe 407 will touch the conductive plate 402, changing the resistance from infinity to a finite value, and sensor 409 will register this change. When switch mirror 401 is parallel to and level with substrate 404, probe 407 will not touch conductive plate 402, creating an open circuit, and sensor 409 will register an extremely large resistance (approaching infinity).

Figure 5:
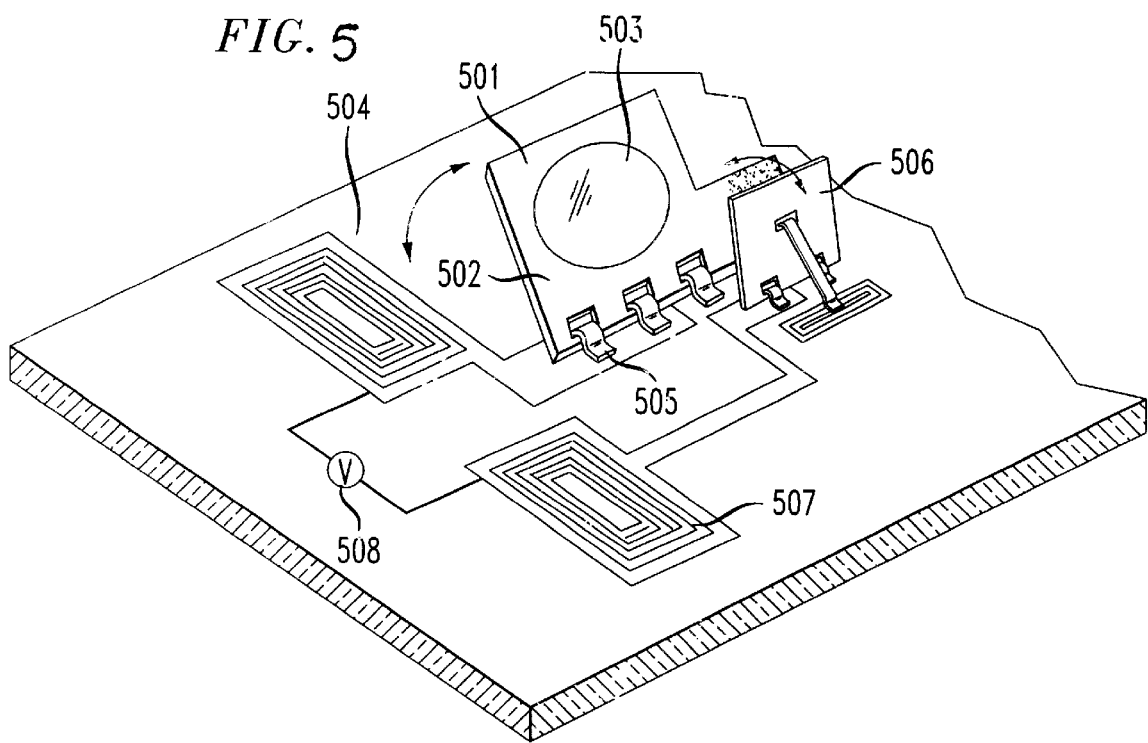
FIG. 5 is a perspective view of a switching mirror with position monitoring via the capacitance method and apparatus of the present invention.

FIG. 5 shows an embodiment of an apparatus to monitor the position of the switch mirror using electrical capacitance measurements. Switch mirror 501, consisting of conductive plate 502 with reflective surface 503, is attached to substrate 504 via hinge mechanism 505. Switch mirror 501 can rotate from a position which is parallel to and level with substrate 504 to a position perpendicular to substrate 504. It is in this perpendicular position that switch mirror 501 is "on", that is, the mirror at this position reflects and redirects the light beam carrying the data transmission through the switch. A smaller conductive plate 506 is also connected to substrate 504 via a hinge mechanism and is positioned parallel to conductive plate 502 such that there is a small distance between conductive plate 502 and conductive plate 506 when switch mirror 501 is in the perpendicular position. Conductive plate 506 can be affixed permanently in position on substrate 504 or can be hinged and moved into position when required. Circuit 507 connects conductive plate 502 with plate 506, and on this circuit sensor 508 measures the capacitance between plates 502 and 506. When switch mirror 501 is in the perpendicular position, plates 502 and 506 will be close together, resulting in an effective capacitor, and sensor 508 will register a high capacitance value. When switch mirror 501 is parallel to and level with substrate 504, plates 502 and 506 will be perpendicular to one another and further apart, resulting in a poor capacitor, and sensor 508 will register an extremely low capacitance value (approaching zero). From the measured capacitance value, the angle of switch mirror 501 can be determined.

Figure 8:
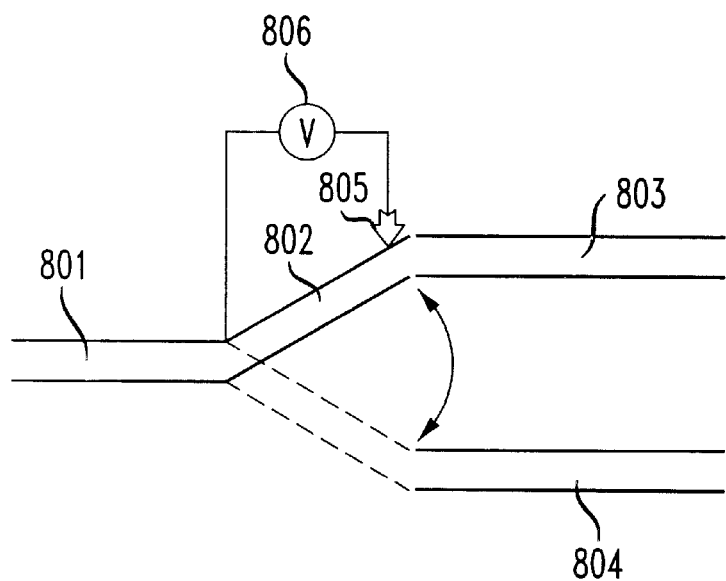
FIG. 8 is a top view of a waveguide switch with position monitoring via the resistance method and apparatus of the present invention.

The resistance and capacitance methods of monitoring the position of a switching mirror can also be applied to waveguide switches. FIG. 8 shows an embodiment of the apparatus to monitor the position of a waveguide switch using electrical resistance measurements. Waveguide 801 has movable portion 802 that can be set to at least two positions so as to transmit the signal being carried by waveguide 801 to waveguide 803 or 804. Waveguide 802 is constructed with a conductive material and a circuit connects waveguide 802 to probe 805. Probe 805 is positioned so that it touches waveguide 802 when waveguide 802 is positioned to transmit the signal to waveguide 803 but does not touch waveguide 802 when the signal is being transmitted to waveguide 804. Sensor 806 on the circuit measures the resistance between waveguide 802 and probe 805. When waveguide 802 is in position to transmit the signal to waveguide 803, probe 805 touches waveguide 802 and sensor 806 measures a finite resistance. When waveguide 802 is in position to transmit the signal to waveguide 804, probe 805 does not touch waveguide 802, creating an open circuit, and sensor 806 measures a resistance approaching infinity.

Similarly, the waveguide switch in FIG. 8 could be configured to use the capacitance method for determining the position of waveguide 802 by positioning a conductive plate to be close to waveguide 802 when it is in position to transmit the signal to waveguide 803 and to be further away from waveguide 802 when it is in position to transmit the signal to waveguide 804.

Figure 6:
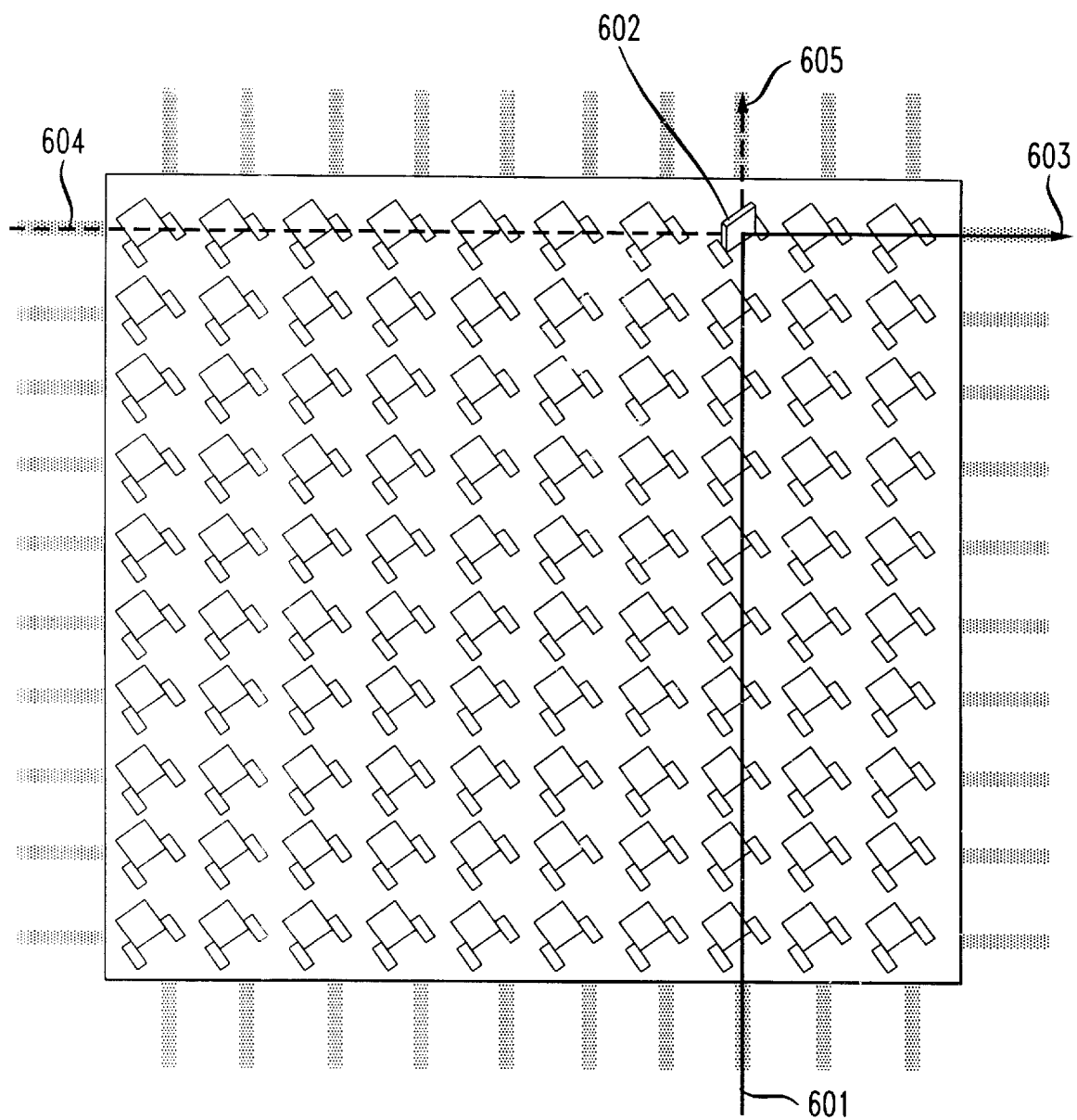
FIG. 6 is a top view of an optical cross connect apparatus with mirror position monitoring via the optical method of the present invention.

FIG. 6 illustrates a method and apparatus for monitoring the position of a switch mirror by using a second light beam directed at the back of the optical switch mirror. A signal light beam enters the switch on path 601, reflects off mirror 602 and exits the switch on path 603, accomplishing the signal redirecting task of the switch. To monitor the position of the mirror, a probe light beam enters the switch on path 604, reflects off the back of mirror 602, and exits the switch on path 605 where it can be received by a probe beam detector. The information received by the probe beam detector can be interpreted to determine if the switch mirror is in the correct position. If mirror 602 was incorrectly positioned, the probe beam would be reflected off in the wrong direction and this would be detected by the probe beam detector. This method and apparatus can be applied to an entire optical cross connect as shown in FIG. 6 by having multiple probe beam detectors positioned at the monitoring outputs from the switch. The input probe beams could be from a common light source to enable very simple checking of a row of switch mirrors or the probe beams could originate from separate light sources having different projection characteristics, such as pilot tones or low-speed bit sequences, that would distinguish the probe beams from one another and allow monitoring of individual switch mirrors.

Figure 7:
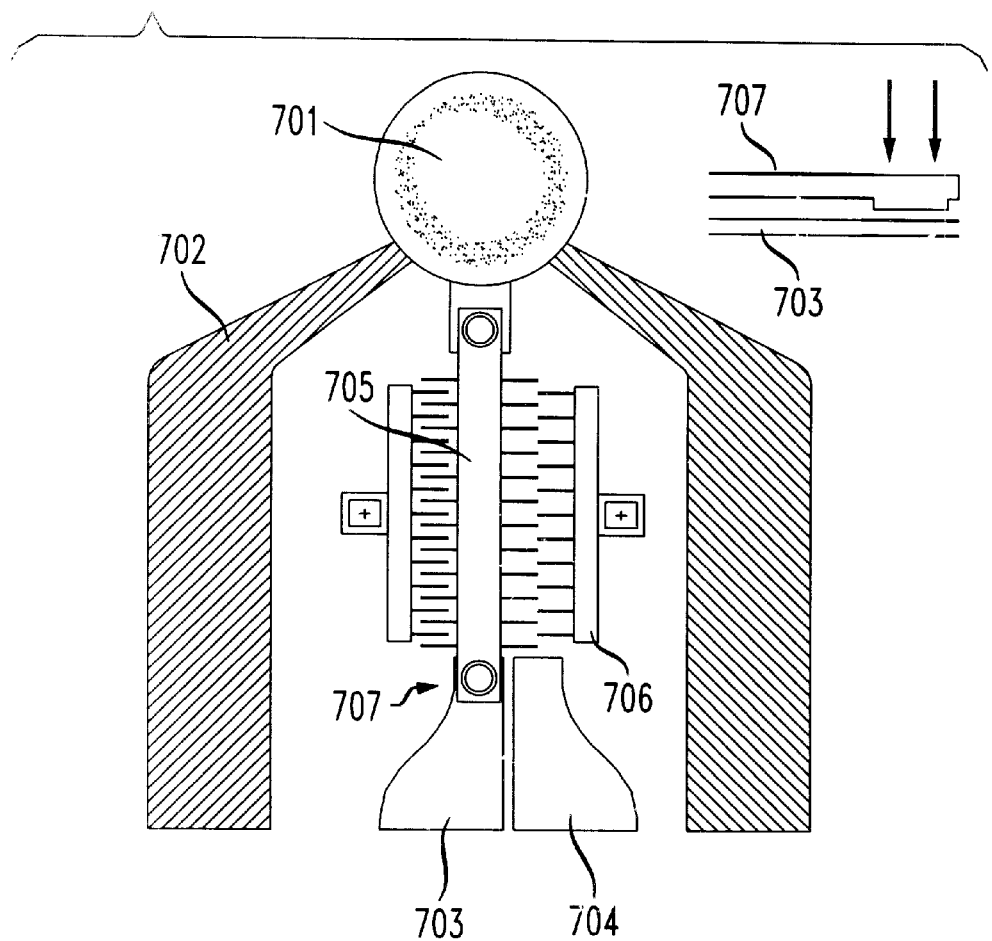
FIG. 7 is a top view of the apparatus of the present invention for testing the photodetector for failure.

FIG. 7 illustrates a method and apparatus for determining if the integrated photodetector has failed. Since the current-voltage curve of a photodetector shows diode behavior when it is functioning correctly and shows an open or short circuit when malfunctioning, comparing its dark current under a reverse bias and diode current under a forward bias can determine if the photodetector has failed. Photodetector 701 is connected to coplanar waveguide 702 providing a ground signal and is rotatably connected to in-plane cantilever 705 which can be positioned to provide a connection to waveguide 703 carrying a forward bias signal or waveguide 704 carrying a reverse bias signal. Cantilever 705 is switched between these positions by the use of comb drive actuator 706, and cantilever probe tip 707 is brought into contact with waveguide 703 or 704 by electrostatic force. To determine if photodetector 701 is functioning correctly, cantilever 705 is switched to connect to waveguide 704, thus applying a reverse bias to photodetector 701. The dark current of photodetector 701 is then measured. Cantilever 705 is then switched to connect to waveguide 703, thus applying a forward bias to photodetector 701. The forward diode current is measured and compared with the dark current measurement. If the measurements show correct diode behavior, then photodetector 701 is functioning correctly. The two waveguide transmission lines 703 and 704 and cantilever 705 could be replaced by a single transmission line and the status of the photodiode could be checked by changing the polarity of the applied electrical bias on the single transmission line.

This method of checking the photodetector for correct operation can be combined with the methods for monitoring switch mirror position to allow the management module of an OXC to quickly identify the likely source of any problems in the switches. If an error such as loss of signal or loss of frame is detected by a photodetector, the OXC management can check both the position of the switch mirrors and the functionality of the photodetector in order to attempt to reroute traffic around the problem as well as to inform repair personnel of the likely source of the problem.

The present invention is not limited to the specific implementations described. It is expected that those skilled in the art will be able to devise other implementations which embody the principles of the present invention and remain within its scope.

What is claimed is:

1. An apparatus for determining the position of an optical switch mirror, comprising:

a first conductive plate on which said optical switch mirror is mounted wherein said first conductive plate is pivotally mounted on a substrate with hinges;

a second conductive plate fixed in a position substantially perpendicular to the substrate such that said second conductive plate is substantially parallel to said first conductive plate when said first conductive plate is substantially perpendicular to the substrate; and a capacitance measuring device coupled to said first conductive plate and said second conductive plate.

2. An apparatus for determining the position of an optical switch mirror, comprising:

a conductive plate on which said optical switch mirror is mounted wherein said conductive plate is pivotally mounted on a substrate with hinges;

a conductive probe fixed in a position such that said conductive probe contacts said conductive plate when the conductive plate is substantially perpendicular to the substrate; and a resistance measuring device coupled to said conductive plate and said conductive probe.

3. An apparatus for measuring the position of an optical switch mirror, comprising:

a movable conductive plate wherein said movable conductive plate is pivotally mounted on a substrate with hinges;

an optical switch mirror mounted on said movable conductive plate;

a conductive probe fixed in a position substantially perpendicular to the substrate such that said conductive probe is substantially parallel to said movable conductive plate when said movable conductive plate is substantially perpendicular to the substrate; and a means for measuring an electrical characteristic of a circuit comprised of at least said conductive plate, said conductive probe, and said means for measuring.

4. The apparatus of claim 3 wherein said electrical characteristic is capacitance.

5. The apparatus of claim 3 wherein said electrical characteristic is resistance.

6. The apparatus of claim 3 wherein said movable conductive plate has at least two positions and said movable conductive plate contacts said conductive probe in at least one of said at least two positions.

7. The apparatus of claim 6 wherein said movable conductive plate is pivotally mounted on a substrate with hinges, and said conductive probe is fixed in a position such that said conductive probe contacts said movable conductive plate when the movable conductive plate is substantially perpendicular to the substrate.

8. The apparatus of claim 7 wherein said electrical characteristic is resistance.

9. The apparatus of claim 3 wherein said electrical characteristic is capacitance.

* * * * *